(No Model.)
L. D. HASKELL, Jr.
THILL COUPLING.
No. 411,661. Patented Sept. 24, 1889.
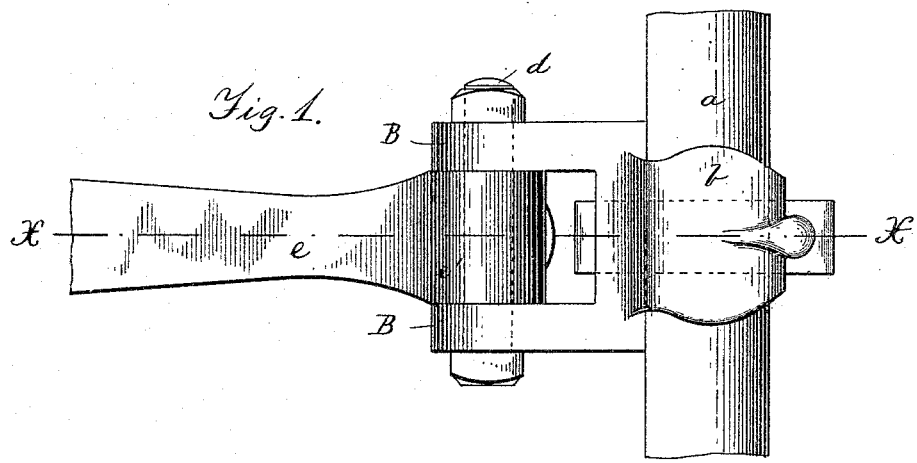
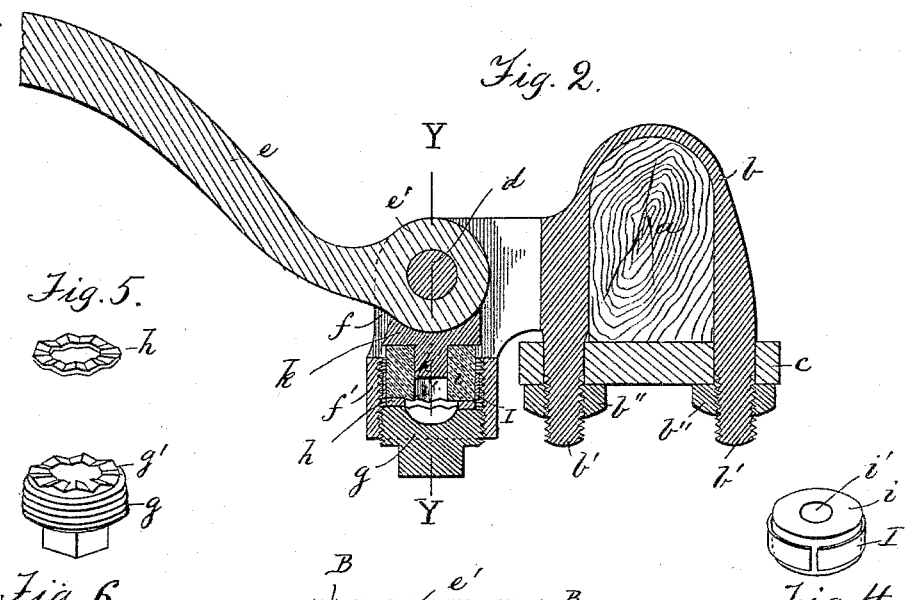
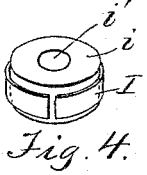
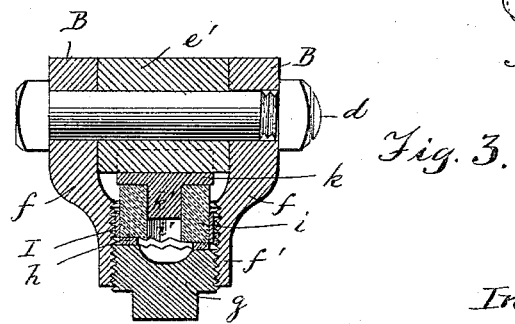
Witnesses.
Thos W. Holiday
Elizabeth J. Torrey
Inventor:
Luther D. Haskell Jr.
by Alban Andrew, his atty.

UNITED STATES PATENT OFFICE.

LUTHER D. HASKELL, JR., OF SALEM, MASSACHUSETTS, ASSIGNOR OF ONE-HALF TO JOSEPH WEBSTER DANE, OF SAME PLACE.

THILL-COUPLING.

SPECIFICATION forming part of Letters Patent No. 411,661, dated September 24, 1889.

Application filed July 13, 1889. Serial No. 317,386. (No model.)

*To all whom it may concern:*

Be it known that I, LUTHER D. HASKELL, Jr., a citizen of the United States, and a resident of Salem, in the county of Essex and State of Massachusetts, have invented new and useful Improvements in Thill-Couplings, of which the following, taken in connection with the accompanying drawings, is a specification.

This invention relates to improvements in thill-couplings, and it is carried out as follows, reference being had to the accompanyings, where—

Figure 1 represents a plan view of the invention. Fig. 2 represents a longitudinal section on the line X X shown in Fig. 1. Fig. 3 represents a cross-section on the line Y Y shown in Fig. 2. Fig. 4 represents a detail perspective view of the elastic packing and its expansive metallic inclosing-band. Fig. 5 represents a detail perspective view of the corrugated metallic washer interposed between the elastic packing and the regulating-screw; and Fig. 6 represents a detail perspective view of the said regulating-screw.

Similar letters refer to similar parts wherever they occur on the different parts of the drawings.

$a$ is the axle, to which is secured the clasp $b$, by means of the screws $b'$ $b'$, nuts $b''$ $b''$, and yoke $c$, in the usual manner. In one piece with the clasp $b$ are made the perforated ears B B, between which is pivoted on the bolt $d$ the eye $e'$ of the shaft-iron $e$, as usual. I prefer to make in one piece with the ears B B the downwardly-projecting yoke $f$, having its lower portion made in the form of an internally-screw-threaded hub $f'$, into which is screwed from below the regulating-screw $g$, as shown in Figs. 2, 3, and 6. The upper end of said regulating-screw $g$ is corrugated or serrated as shown at $g'$ in Fig. 6, and on top of such serrated or corrugated surface is arranged a corresponding serrated or corrugated metal washer $h$, as shown in Figs. 2, 3, and 5. On top of the said washer $h$ is located the perforated rubber packing $i$, having a central perforation $i'$, as shown in Figs. 2, 3, and 4.

$k$ is a friction-block, preferably made of composition metal, and having its upper end made concave, so as to fit, or nearly so, the convexity of the shaft-eye $e'$, as shown in Figs. 2 and 3. The under side of the block $k$ rests on the rubber packing $i$, and is provided with a projection $k'$, inserted in the perforation $i'$ of the rubber packing $i$, as shown in Figs. 2 and 3.

The yoke $f$ is shown in the drawings as being made in one piece with the ears B B; but this is not essential, as it may be pivoted on the bolt $d$, if so desired. Also, the packing $i$ is described as being made of rubber; but it may be made of metal in the form of a spiral spring without departing from the essence of my invention. The elastic packing $i$ is surrounded by an expansive metal split band I, so as to prevent said packing from being crowded outward into the internal screw-thread of the hub $f'$, as shown in Figs. 2, 3, and 4.

The object of having the upper end $g'$ of the regulating-screw $g$ made corrugated or serrated, as shown and described, combined with the serrated or corrugated metal washer $h$, interposed between said screw and the elastic packing $i$, is to cause said screw to be held locked in position relative to said washer and packing, and thus preventing said screw from being turned loose by the jar of the carriage and its connections. The upper surface of the serrated or corrugated metal washer $h$ being crowded into the lower end of the elastic packing $i$ causes it to be pressed into and locked to the under side of said packing, and the screw $g$ having serrations or corrugations $g'$, corresponding to those of the washer $h$, causes said screw to be locked to the said washer after being set up, and thus prevents its being worked loose by the shaking or vibrations of the coupling or its connections.

Having thus fully described the nature, construction, and operation of my invention, I wish to secure by Letters Patent and claim—

1. The herein-described thill-coupling, consisting of the clasp $b$ and its ears B B, the shaft-iron $e$, having eye $e'$ pivoted to said ears, and the yoke $f$ $f'$, combined with the friction-block $k$ $k'$, the packing $i$, the serrated or corrugated washer $h$, and regulating-screw $g$, having its upper end $g'$ serrated or corrugated, substantially as and for the purpose set forth.

2. The clasp $b$ and its ears B B, and the shaft-iron eye $e'$, pivoted to said ears, combined with the yoke $f f'$, friction-block $k k'$, elastic spring $i$, and its expansive band I, the corrugated or serrated washer $h$, and regulating-screw $g$, having upper serrated or corrugated surface $g'$, as and for the purpose set forth.

In testimony whereof I have signed my name to this specification, in the presence of two subscribing witnesses, on this 11th day of July, A. D. 1889.

LUTHER D. HASKELL, JR.

Witnesses:
ALBAN ANDRÉN,
ELIZABETH J. TORREY.